US008913233B2

United States Patent
Sutin et al.

(10) Patent No.: US 8,913,233 B2
(45) Date of Patent: Dec. 16, 2014

(54) IMAGING ZOOM FOR WIDE FIELD-OF-VIEW IMAGING SPECTROMETER

(75) Inventors: Brian M. Sutin, Claremont, CA (US); Richard A. Heppner, Claremont, CA (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 284 days.

(21) Appl. No.: 13/559,067

(22) Filed: Jul. 26, 2012

(65) Prior Publication Data
US 2014/0233027 A1 Aug. 21, 2014

(51) Int. Cl.
*G01J 3/28* (2006.01)
*G01J 3/02* (2006.01)

(52) U.S. Cl.
CPC ............... *G01J 3/2823* (2013.01); *G01J 3/024* (2013.01)
USPC .......................................................... 356/72

(58) Field of Classification Search
USPC ................................. 356/300–334
See application file for complete search history.

(56) References Cited

U.S. PATENT DOCUMENTS

| 4,509,857 | A |   | 4/1985 | Vermande |
| 5,768,040 | A |   | 6/1998 | Macenka et al. |
| 5,831,762 | A | * | 11/1998 | Baker et al. ................... 359/353 |
| 7,703,932 | B2 |   | 4/2010 | Cook |

OTHER PUBLICATIONS

H. R. Pollock et al., "Wide Field Imaging Spectrometer (WFIS)—Instrument Design and First Field Tests", from Lunar and Planetary Science XXXVI (2005), 2 pages.

* cited by examiner

*Primary Examiner* — Abdullahi Nur
(74) *Attorney, Agent, or Firm* — Kinney & Lange, P.A.

(57) ABSTRACT

An imaging system comprises a wide field of view (FOV) telescope, a narrow FOV telescope, a spectrometer, an imaging detector, an image slicer, and a selection mechanism. The wide FOV telescope is configured to produce a one-dimensional optical image of a broad field of view (FOV) F. The narrow FOV telescope is configured to produce a two-dimensional optical image of a narrow FOV f. The spectrometer is configured to produce a spectrum of a one-dimensional image, and the imaging detector is configured to capture that spectrum. The image slicer is configured to break the two-dimensional optical image into a series of one-dimensional segments. The selection mechanism operable in either of two modes: a wide FOV mode transmitting the one-dimensional optical image to the spectrometer, and a zoom mode transmitting a one-dimensional concatenation of the series of one-dimensional segments to the spectrometer.

15 Claims, 3 Drawing Sheets

IMAGING ZOOM FOR WIDE FIELD-OF-VIEW IMAGING SPECTROMETER

BACKGROUND

The present invention relates generally to imaging spectrometer devices, and in particular to a slewing narrow-angle imaging zoom for a wide field-of-view imaging spectrometer (WFIS).

WFIS systems are useful for range of applications, and are particularly suited to high altitude hyperspectral imaging applications. As such, WFIS systems are most often found on airplanes, unmanned aerial vehicles (UAVs) and imaging satellites. Conventional WFIS systems are one-dimensional imagers with a single wide angle reception slit that receives light into a two-mirror Schwarzchild telescope. This Schwarzchild telescope is coupled to the flat entrance slit of an imaging spectrometer via aspheric mirrors. The imaging spectrometer produces a two-dimensional spectrographic projection of the one-dimensional Wide FOV telescope image, wherein one dimension corresponds to spatial/angular location, and another to wavelength. This projection is received by an imaging detector such as a charge coupled device (CCD) camera. Images captured by a WFIS system can be analyzed in real time, or stored for later analysis. Although WFIS systems may be constructed to operate only over the visual spectrum, many WFIS systems are hyperspectral imagers that also capture spectral information over infrared and/or ultraviolet spectra. Increased spectral range and resolution are both useful for differentiating between objects that appear similar across visible wavelengths, such as visually camouflaged objects. Specific applications may, for instance, require IR images, UV images, or images across a wide spectrum including IR, visible, and UV wavelengths. Hyperspectral imaging can facilitate highly accurate object and pattern recognition. For in-depth description of one WFIS system, see U.S. Pat. No. 5,768,040, entitled "Wide Field-of-View Imaging Spectrometer" and "Wide Field Imaging Spectrometer (WFIS)—Instrumental Design and First Field Tests" (H. R. Pollock et al.), *Lunar and Planetary Science* XXXVI (2005).

Conventional WFIS systems can gather staggeringly large quantities of spectral data. In some applications, these quantities can exceed onboard storage and/or transmission capacities, resulting in the loss of valuable imaging data.

SUMMARY

The present invention is directed toward an imaging system comprising a wide field of view (FOV) telescope, a narrow FOV telescope, a spectrometer, an imaging detector, an image slicer, and a selection mechanism. The wide FOV telescope is configured to produce a one-dimensional optical image of a broad field of view (FOV) F. The narrow FOV telescope is configured to produce a two-dimensional optical image of a narrow FOV f. The spectrometer is configured to produce a spectrum of a one-dimensional image, and the imaging detector is configured to capture that spectrum. The image slicer is configured to break the two-dimensional optical image into a series of one-dimensional segments. The selection mechanism is operable in either of two modes: a wide FOV mode transmitting the one-dimensional optical image to the spectrometer, and a zoom mode transmitting a one-dimensional concatenation of the series of one-dimensional segments to the spectrometer.

DETAILED DESCRIPTION

Figure 1:
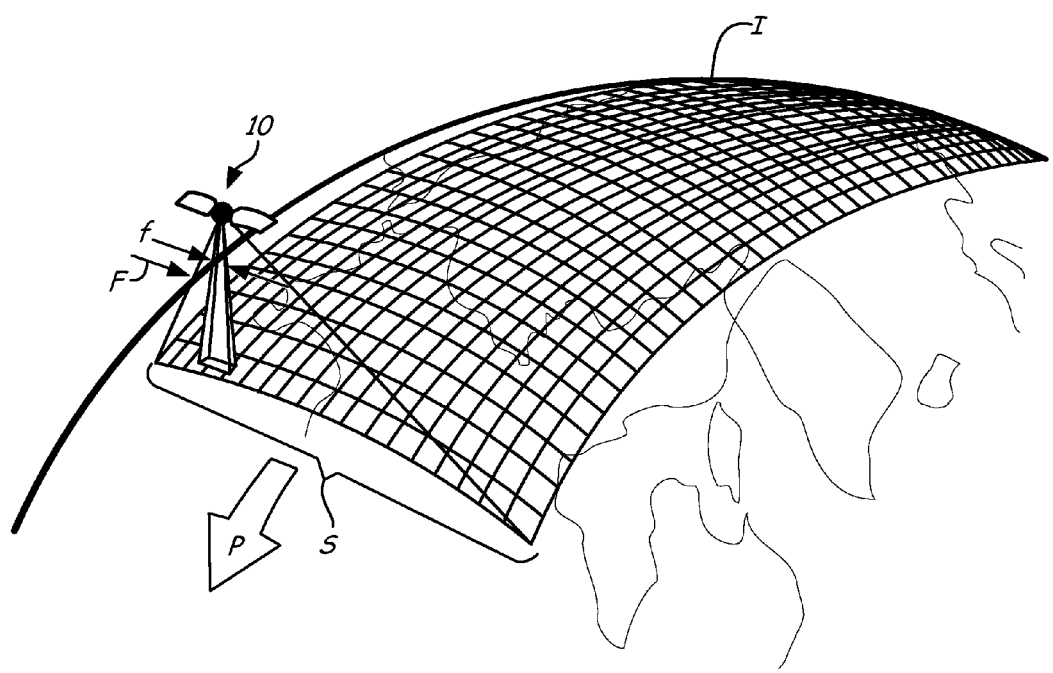
FIG. 1 is a pictoral representation of a WFIS system with narrow field of view zoom operating over a limited field of view.

FIG. 1 is a pictoral representation of WFIS system 10 traversing imaging region I. WFIS system 10 includes both wide field of view (FOV) telescope 12 (FIG. 2) and narrow field of view high-resolution telescope 28 (FIG. 2), as described in greater detail below with respect to FIG. 2. WFIS system 10 may, for instance, be mounted in an airplane, a UAV or a satellite, and region I may be a selected section of the surface of the Earth. Wide FOV telescope 12 provides a one-dimensional low resolution image of span S corresponding to broad field of view F of wide FOV telescope 12, e.g. 120+°. For some applications, span S may be substantially a horizon-to-horizon image of imaging region I. WFIS system 10 captures the second dimension of imaging region I as it physically traverses imaging region I by flying or orbiting over imaging region I in pushbroom direction P. In this way, wide FOV telescope 12 acts as a "pushbroom" imager, sequentially imaging adjacent slices of imaging region I along an axis defined by pushbroom direction P.

WFIS system 10 receives a large quantity of spectral image data from wide FOV telescope 12. This spectral image data is used to orient a steerable mirror of narrow FOV high-resolution telescope 28, thereby directing narrow FOV f of narrow FOV high-resolution telescope 28. Narrow FOV f is a two-dimensional FOV encompassing a small fraction of the total spanwise extent of broad FOV F. Narrow FOV f can be directed anywhere within the spanwise extent of broad FOV F, and along a more limited angular range along the axis of pushbroom direction P.

WFIS system 10 analyzes spectral data from wide FOV telescope 12 to identify points of interest (PoIs) within broad FOV F. Narrow FOV high-resolution telescope 28 is directed to these PoIs, allowing WFIS system 10 to capture high resolution images PoIs within narrow FOV f. In some embodiments, WFIS system 10 only stores and/or transmits imaging data corresponding to narrow FOV f images directed at PoIs. This two-step imaging process facilitates capture of higher resolution images than are possible with conventional WFIS systems, while reducing the total volume of data stored or transmitted by WFIS 10.

Figure 2:
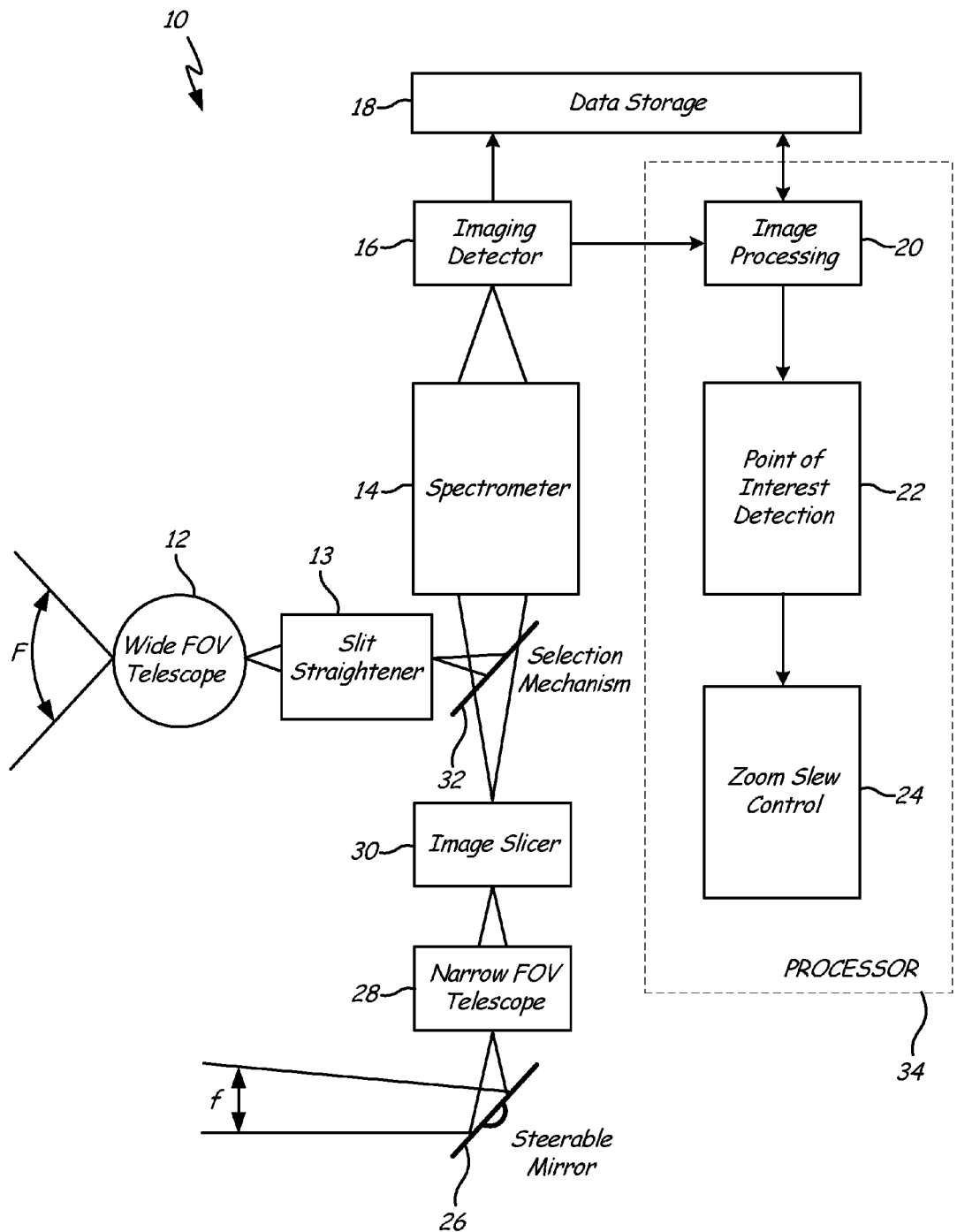
FIG. 2 is a schematic view of the WFIS system of FIG. 1

FIG. 2 is a schematic block diagram of WFIS system 10, comprising wide FOV telescope 12, slit straightener 13, spectrometer 14, imaging detector 16, data storage device 18, image processing block 20, PoI detection block 22, zoom slew control block 24, steerable mirror 26, narrow FOV telescope 28, image slicer 30, selection mechanism 32, and processor 34. Wide FOV telescope 12 is a low resolution telescope that operates together with spectrometer 14 to produce a wide FOV spectral image captured by imaging detector 16 and processed by image processing block 20. Image processing block 20, PoI detection block 22, and zoom slew control block 24 are logical components of processor 24, a data processor that may be embodied by one or several logic-capable devices such as microprocessors. Steerable mirror 26 is a mirror controllable by zoom slew control block 24 to direct narrow FOV f. Narrow FOV telescope 28 is a conventional optical telescope, e.g. a circular or rectangular FOV telescope with narrow FOV f. Image slicer 30 is may be an optical component configured to split the two dimensional output of narrow FOV telescope 28 into an elongated one-dimensional image suitable for reception by selection mechanism 32 and spectrometer 14.

Wide FOV telescope 12 is a telescope having a wide one-dimensional FOV, such as a two-mirror Schwarzchild telescope. Wide FOV telescope 12 operates substantially as known in the art, and is coupled to spectrometer 14 via selection mechanism 32. Slit straightener 13 is an optical alignment mechanism configured to condition the output of wide FOV telescope 12 for reception at spectrometer 14. Slit straightener 13 may, for instance, include one or more aspheric mirrors configured to straighten the output of wide FOV telescope 12 for reception at a flat input slit of spectrometer 14. Selection mechanism 32 is a switching device configured to direct the output of either slit straightener 13 or image slicer 30 to the input slit of spectrometer 14. Selection mechanism 32 can operate in either of two modes: a WFIS mode wherein optics from wide FOV telescope 12 are directed to spectrometer 14, and a zoom mode wherein optics from image slicer 30 are directed to spectrometer 14. Selection mechanism 32 may, for instance, comprise one or more single lens reflex (SLR)-type movable mirrors that can be inserted into an optical path leading to spectrometer 14 to override input from one of wide FOV telescope 12 or image slicer 30 in favor of the other. Alternatively, selection mechanism 32 may comprise a beam combiner with individual shutters or an LED shutter. Image slicer 30 and narrow FOV telescope 28 are described in greater detail below. In some embodiments, slit straightener 13, selection mechanism 32, and image slicer 30 may be combined into a single complex mechanism.

Spectrometer 14 receives a one-dimensional image from selection mechanism 32 via the flat slit. From this one-dimensional image, spectrometer 14 produces a two-dimensional spectrographic projection having one spatial dimension, and one spectral (i.e. wavelength) dimension. This spectrographic projection is transmitted to imaging detector 16, which may for instance be a CCD camera. Imaging detector 16 forms a digital spectrographic image from the output of spectrometer 14. This image can be stored in data storage device 18, which may be any kind of machine readable memory. Data storage device 18 is capable of rapidly receiving and recording large quantities of spectral imaging data. Data storage device 18 need not record all spectral imaging data produced by spectrometer 14. In particular, some embodiments of spectrometer 10 may only record imaging data from narrow FOV telescope 28, and not from wide FOV telescope 12.

Image processing block 20 is a portion of processor 34 responsible for identifying and sorting features of image spectra into categories such as trees, sand, water, and so forth based on wavelength, shape, and other object-recognition criteria. A wide range of object recognition methods may be used without departing from the scope and spirit of the present invention. Image processing block 20 may, in some embodiments, store processed image data in data storage device 18, or retrieve image categorization information from data storage block 18 for use in processing spectral images from imaging detector 16.

PoI detection block 22 uses the categorizations provided by image processing block 20 to identify PoIs within hyperspectral images corresponding to broad FOV F. These PoIs may correspond to unusual spectra, unusual combinations of categories, moving objects, and so forth. In some embodiments, PoIs may be military threats or targets. Zoom slew control 24 adjusts the angle of steerable mirror 26 to direct narrow FOV f at PoIs detected by PoI detection block 22.

Steerable mirror 26 is a mirror configured to direct and define narrow FOV f of narrow FOV telescope 28. Steerable mirror 26 can direct narrow FOV f across the entire span S of broad FOV F, and across a narrower angular range along an axis defined by pushbroom direction P (see FIG. 1). Narrow FOV telescope 28 is a high resolution optical telescope with a two dimensional FOV. Image slicer 30 receives a two-dimensional optical image from narrow FOV telescope 28, and converts this two-dimensional image into a one-dimensional concatenation of adjacent slices, as described below with respect to FIG. 3. Image slicer 30 transforms the two-dimensional output of narrow FOV telescope 28 into a longer one-dimensional image suited for reception by selection mechanism 32 and the flat inlet slit of spectrometer 14.

When selection mechanism 32 is in its zoom mode, the transformed one-dimensional image produced by image slicer 30 is spectrographically projected by spectrometer 14 and captured by imaging detector 16 identically to WFIS images from wide FOV telescope 12. Image processing block 20 decomposes each frame of the resulting two-dimensional spectral image into a three dimensional data cube with two spatial dimensions corresponding to the original spatial dimensions of narrow FOV f and one spectral (i.e. wavelength) dimension. In some embodiments, only this data cube may be stored in data storage device 18. WFIS system 10 may operate primarily in a WFIS scanning mode wherein selection mechanism 32 is in a WFIS mode and processor 34 continuously searches for PoIs. When a PoI is located, WFIS system 10 briefly enters a zoom mode wherein steerable mirror 26 is directed at the PoI, selection mechanism 32 switches to its zoom mode, and image processing block 20 assembles a three-dimensional data cube as described above. This data cube is stored in data storage device 18. This approach has the advantage of capturing high resolution images of any PoI within broad FOV F without needlessly capturing large volumes of hyperspectral imaging data corresponding to non-PoI features.

Figure 3:
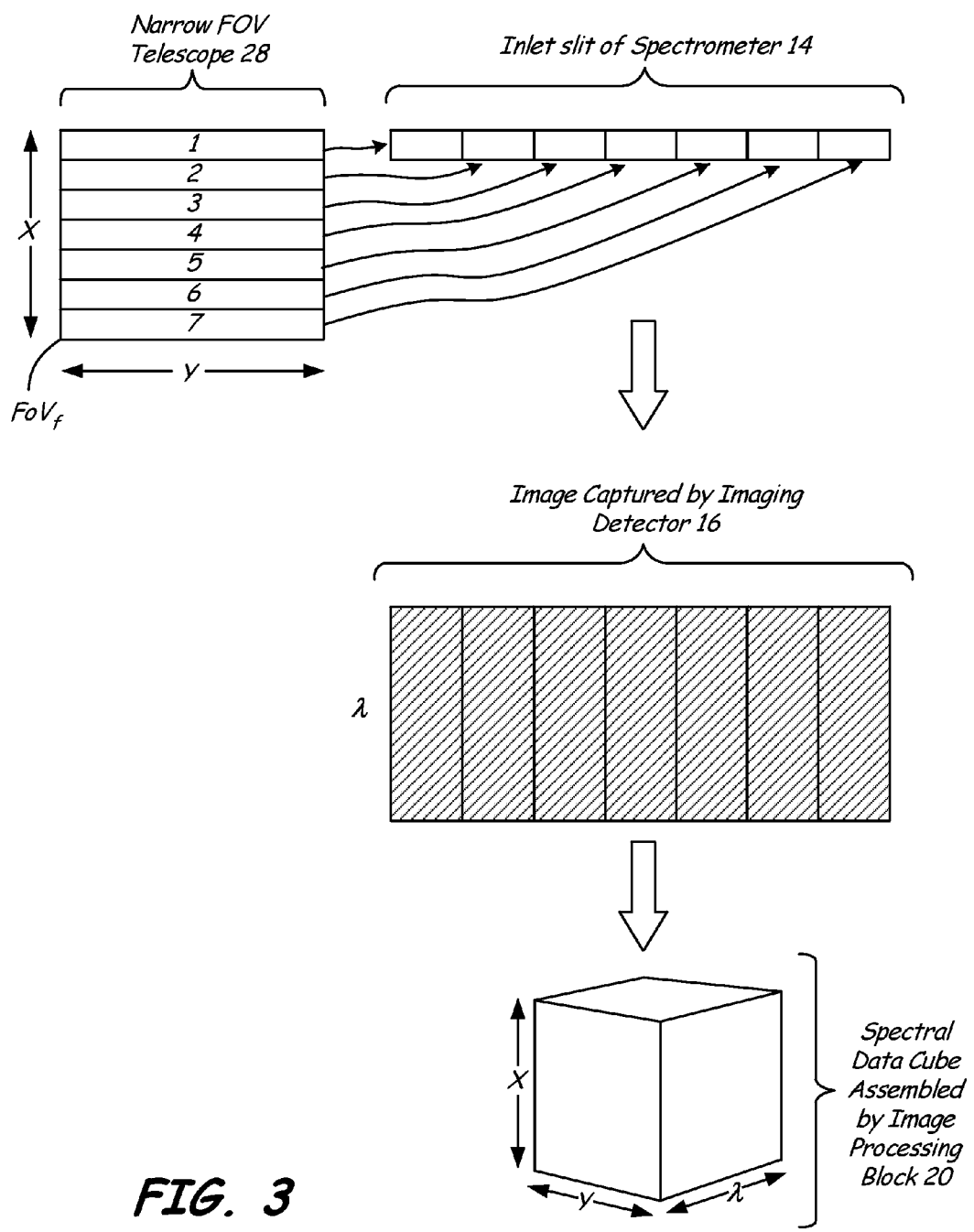
FIG. 3 is a step-by-step breakdown of a narrow field-of-view image processed by the WFIS system of FIGS. 1 and 2.

FIG. 3 depicts a step-by-step breakdown of image processing of the output of narrow FOV telescope 28. Narrow FOV telescope 28 produces a high resolution image of FOV f having two dimensions: x and y. These dimensions may, for instance, correspond to spanwise dimension and a pushbroom dimension of broad FOV F. Image slicer 30 slices the two dimensional output of narrow FOV telescope 28 into a series of substantially one-dimensional slices, each corresponding to a range of dimension x. FIG. 3 depicts seven such slices, but in practice FOV f may be broken into more or fewer slices. These slices are concatenated to form a single elongated one-dimensional image received at the input slit of spectrometer 14. In various embodiments this concatenation may be performed either by image slicer 30, or by selection mechanism 32. Spectrometer 14 projects this one-dimensional image into a two-dimensional spectroscopic image wherein one dimension corresponds to wavelength, and the other to position at the inlet slit of spectrometer 14. Image processing block 20 of processor 34 reassembles this two-dimensional spectral image into a spectral data cube having dimensions corresponding to wavelength, and spatial dimensions x and y of narrow FOV f.

WFIS system 10 can capture high resolution spectral data cubes corresponding to any narrow FOV f within broad FOV F. In particular, narrow FOV f is selected to align with PoIs detected in broad FOV F using Wide FOV telescope 12. Hyperspectral images captured by imaging detector 16 from Wide FOV telescope 12 and narrow FOV telescope 28 may be hyperspectral images including infrared and/or ultraviolet spectral data. Image processing block 20 and PoI detection block 22 may utilize this hyperspectral data to better categorize image spectra and identify PoIs for high resolution viewing by narrow FOV telescope 28. WFIS system 10 captures high resolution images of PoIs located anywhere within broad FOV F without needlessly storing large volumes of non-PoI hyperspectral imaging data in data storage device 18, or transmitting large volumes of non-PoI data to remote receivers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An imaging system comprising:
   a wide field of view (FOV) telescope configured to produce a one-dimensional optical image of a broad FOV F;
   a narrow FOV telescope configured to produce a two-dimensional optical image of a narrow FOV f;
   a spectrometer configured to produce a spectrum of a one-dimensional image;
   a slit straightener configured to condition the output of the wide FOV telescope for reception at a straight input slit of the spectrometer;
   an imaging detector configured to capture the spectrum;
   an image slicer configured to break the two-dimensional optical image into a series of one-dimensional segments; and
   a selection mechanism operable in either of two modes: a wide FOV mode transmitting the one-dimensional optical image to the spectrometer, and a zoom mode transmitting a one-dimensional concatenation of the series of one-dimensional segments to the spectrometer.

2. The imaging system of claim 1, wherein the wide FOV telescope is configured to sequentially capture a series of adjacent one-dimensional images spanning a spanwise range S and progressing in a pushbroom direction P.

3. The imaging system of claim 1, wherein the narrow FOVf can be directed anywhere within a spanwise range S.

4. The imaging system of claim 1, wherein the slit straightener comprises at least one aspheric mirror.

5. The imaging system of claim 1, wherein the selection mechanism comprises one or more single lens reflex (SLR)-type movable mirrors configured to switch between feeding the output of the image slicer to the spectrometer, and feeding the output of the slit straightener to the spectrometer.

6. The imaging system of claim 1, wherein the selection mechanism comprises a beams combiner with individual shutters or an LED shutter configured to switch between feeding the output of the image slicer to the spectrometer, and feeding the output of the slit straightener to the spectrometer.

7. An imaging system comprising:
   a wide field of view (FOV) telescope configured to produce a one-dimensional optical image of a broad FOV F;
   a narrow FOV telescope configured to produce a two-dimensional optical image of a narrow FOV f;
   a spectrometer configured to produce a spectrum of a one-dimensional image;
   an imaging detector configured to capture the spectrum;
   an image slicer configured to break the two-dimensional optical image into a series of one-dimensional segments
   an image processing block configured to identify and categorize features of the captured spectrum;
   a point of interest (PoI) detection block configured to identify PoIs within broad FOV F based on features identified and categorized by the image processing block;
   a slew control block configured to direct narrow FOVf to PoIs identified by the PoI detection block; and
   a selection mechanism operable in either of two modes: a wide FOV mode transmitting the one-dimensional optical image to the spectrometer, and a zoom mode transmitting a one-dimensional concatenation of the series of one-dimensional segments to the spectrometer.

8. The imaging system of claim 7, wherein the slew control block directs the narrow FOV f by controlling an orientation of a steerable mirror.

9. The imaging system of claim 7, wherein the image processing block assembles a spectral data cube from captured spectra corresponding to the narrow FOV f, the spectral data cube having two spatial dimensions and one wavelength dimension.

10. The imaging system of claim 7, wherein the wide FOV telescope comprises a data storage device configured to store the spectrum.

11. The imaging system of claim 7, wherein the data storage device only stores spectra produced from the two-dimensional optical image.

12. A wide field-of-view imaging spectrometer (WFIS) system comprising:
    a wide FOV telescope configured to produce a one-dimensional optical image of a broad field of view (FOV) F;
    a narrow FOV telescope configured to produce a two-dimensional optical image of a narrow FOV f;
    a spectrometer configured to produce a spectrum of a one-dimensional image;
    an imaging detector configured to capture the spectrum;
    an image slicer configured to break the two-dimensional optical image into a series of one-dimensional segments;
    a selection mechanism operable in either of two modes: a WFIS mode transmitting the one-dimensional optical image to the spectrometer, and a zoom mode transmitting a one-dimensional concatenation of the series of one-dimensional segments to the spectrometer;
    an image processing block configured to identify and categorize features of the captured spectrum;
    a point of interest (PoI) detection block configured to identify PoIs within broad FOV F based on features identified and categorized by the image processing block; and
    a zoom slew control block configured to direct the narrow FOV f to PoIs identified by the PoI detection block.

13. The WFIS system of claim 12, wherein the image processing block assembles a spectral data cube from captured spectra corresponding to the narrow FOV f, the spectral data cube having two spatial dimensions and one wavelength dimension.

14. The WFIS system of claim 12, wherein the Wide FOV telescope comprises a data storage device configured to store the spectrum.

15. The WFIS system of claim 12, wherein the zoom slew control block directs the narrow FOV f by controlling an orientation of a steerable mirror.

* * * * *